(12) United States Patent
Matsumori (10) Patent No.: US 6,540,143 B1
(45) Date of Patent: Apr. 1, 2003

(54) SYSTEM AND METHOD FOR RECOVERING BAR CODE ERRORS

(75) Inventor: Kunihiko Matsumori, San Diego, CA (US)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/574,486

(22) Filed: May 19, 2000

(51) Int. Cl.[7] .................................................. G06K 7/10
(52) U.S. Cl. .................. 235/462.13; 235/382; 235/385; 235/462.12; 340/5.9; 705/20
(58) Field of Search ................................. 235/383, 385, 235/462.12, 462.13; 340/5.9, 5.91, 5.92; 705/20, 22

(56) References Cited

U.S. PATENT DOCUMENTS

| | | | |
|---|---|---|---|
| 4,901,073 A | 2/1990 | Kibrick .......................... 341/13 |
| 5,446,271 A | 8/1995 | Cherry et al. ................ 235/462 |
| 5,473,148 A | 12/1995 | Tanaka et al. ............... 235/462 |
| 5,557,721 A | 9/1996 | Fite et al. ..................... 395/148 |
| 5,636,292 A | 6/1997 | Rhoads ........................ 382/232 |
| 5,734,839 A | 3/1998 | Enoki et al. ................. 395/220 |
| 5,761,219 A | * | 6/1998 | Maltsev .................... 371/37.01 |
| 5,767,498 A | * | 6/1998 | Heske, III et al. ........... 235/463 |
| 5,918,212 A | * | 6/1999 | Goodwin, III ................ 705/20 |
| 5,933,548 A | * | 8/1999 | Morisawa .................... 382/305 |
| 5,939,700 A | * | 8/1999 | Ackley .................... 235/462.01 |
| 6,149,059 A | * | 11/2000 | Ackley ........................ 235/462 |
| 6,189,792 B1 | * | 2/2001 | Heske, III ............... 235/462.01 |
| 6,246,995 B1 | * | 6/2001 | Walter et al. .................. 705/22 |
| 6,330,972 B1 | * | 12/2001 | Wiklof et al. .......... 235/462.25 |

\* cited by examiner

*Primary Examiner*—Karl D. Frech
*Assistant Examiner*—Seung Ho Lee
(74) *Attorney, Agent, or Firm*—Christie, Parker & Hale, LLP (57) ABSTRACT

A system and method that facilitates the recovery of bar code scanning errors due to irregularities in the bar code. When a bar code scanning error occurs, the system displays the erroneously scanned bar code indicating the characters that could not be resolved successfully. The store clerk or operator need only fill the missing digit to complete the scanned item without manually entering the entire code. Alternatively, a search engine evaluates the portions of the bar code which have been successfully resolved and displays a text and/or graphics list of all products having the resolved portion of the bar code. The store clerk or operator then need only choose the correct item from the screen list to confirm the sale. A printer allows the completed bar code to be printed on a receipt paper. The user of the system may then use the printed bar code for items that continuously result in a bar code error. The system may further keep a list of erroneously scanned bar codes. This allows manufacturers or retailers to improve their bar code quality by identifying those bar codes that consistently give a large number of errors due to a particular repetitive defect.

30 Claims, 8 Drawing Sheets

| PLU TABLE | ITEM INFORMATION | | | |
|---|---|---|---|---|
| SKU | BRAND NAME | GENERIC NAME | PRICE | PRODUCT ICON |
| 00001 | (BRAND NAME) | APPLES | $1.99 | |
| 00002 | (BRAND NAME) | TISSUES | $2.99 | |
| 00003 | (BRAND NAME) | SPICE | $4.99 | |
| 00004 | (BRAND NAME) | SPICE | $3.99 | |
| • | • | • | • | |
| • | • | • | • | |
| • | • | • | • | |
| • | • | • | • | |

SYSTEM AND METHOD FOR RECOVERING BAR CODE ERRORS

FIELD OF THE INVENTION

The present invention relates generally to bar code systems, and more particularly, to a system and method for facilitating the recovery of bar code scanning errors in a retail facility.

BACKGROUND OF THE INVENTION

Bar codes have become a standard way to encode product information to identify such products at the point-of-sale (POS). Bar codes typically consist of a series of parallel bars and spaces with each bar representing a binary one and each space representing a binary zero. The bars and spaces of varying widths correspond to different characters (digits) in a particular bar code symbol. Typical bar code symbols include the Universal Product Code (UPC) used mainly in the United States and Canada, the European Article Number (EAN) used mainly in Europe, and Japanese Article Number (JAN) used mainly in Japan.

Figure 1:
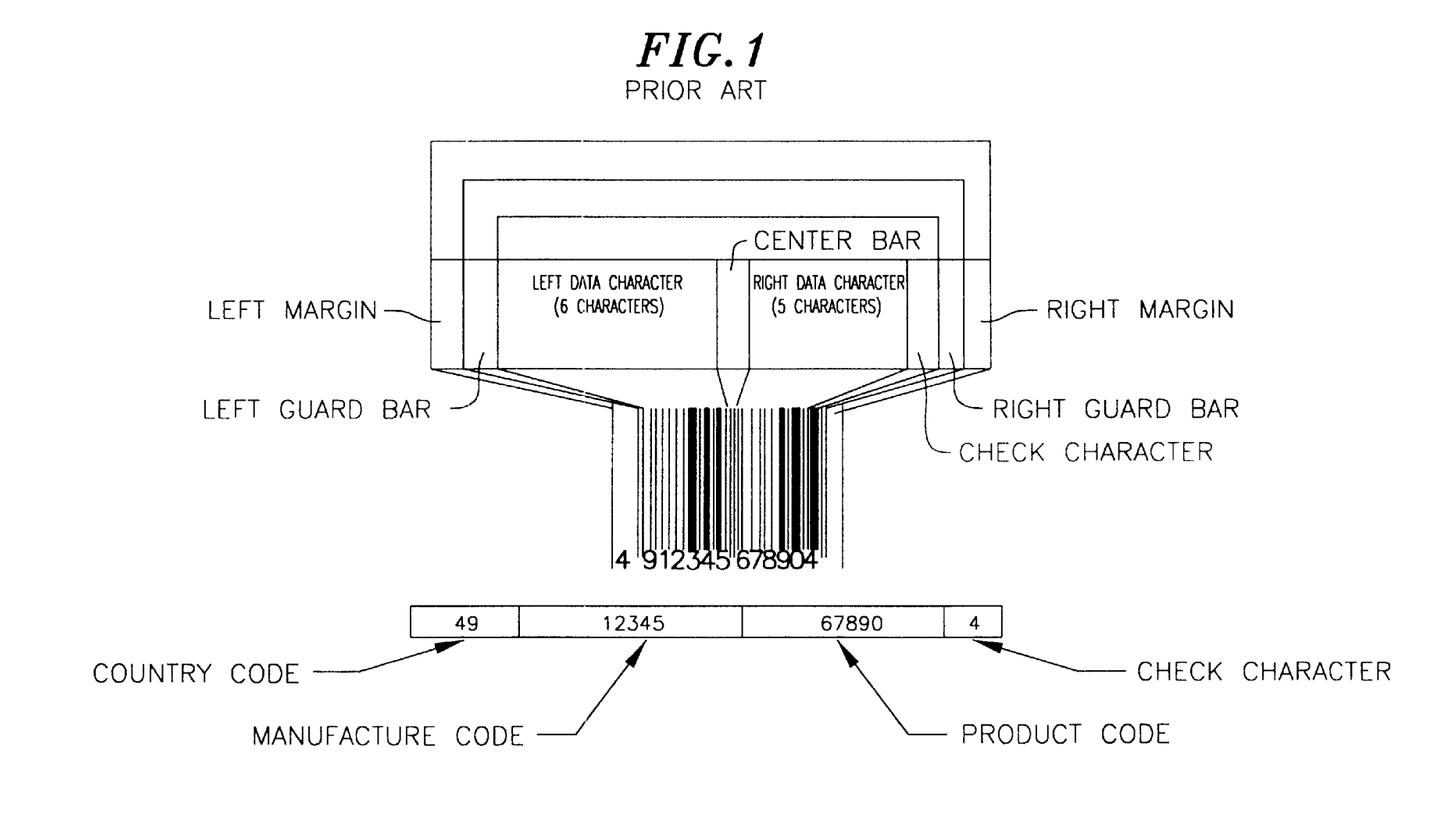
FIG. 1 is an exemplary Japanese Article Number bar code.

FIG. 1 is an exemplary bar code according to the JAN and EAN version. The EAN/JAN bar code generally includes 13 digits including a country code, manufacturer code, product code, and check character. Unlike the EAN/JAN code, the UPC bar code (not shown) consists of 12 digits.

Figure 2:
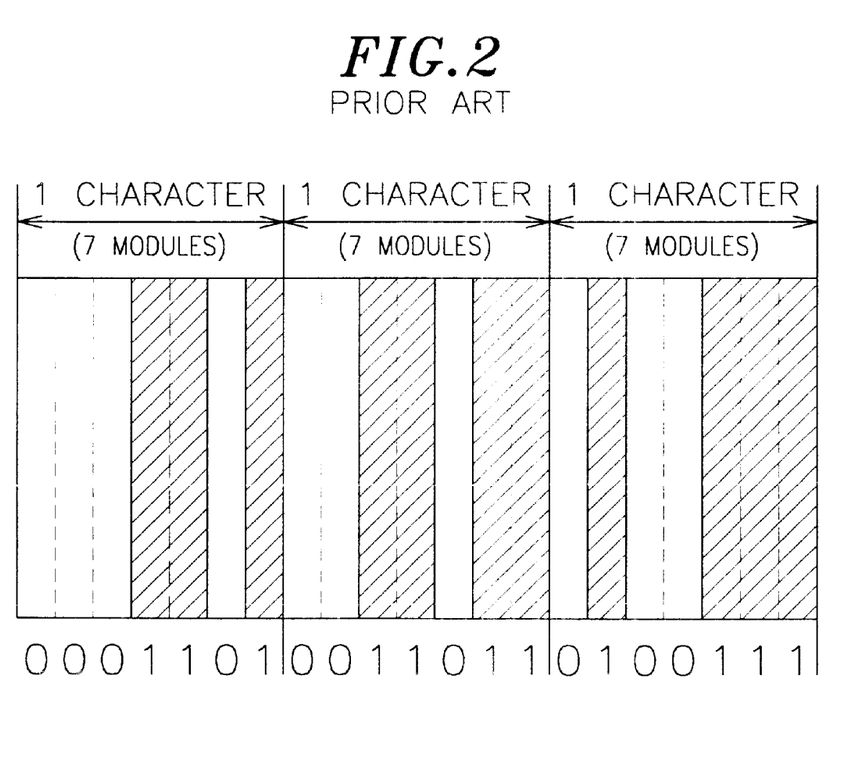
FIG. 2 is an illustration of bar code characters represented by seven modules including two bars and two spaces of varying sizes.

Generally, the bars and spaces making up the bar code are no smaller in width than a specified minimum width referred to as a module. The width of the bars and spaces are therefore multiples of this module size. Different combinations of the bars and spaces of varying sizes make up the unique characters of a bar code symbol. FIG. 2 is an illustration of bar code characters represented by seven modules including two bars and two spaces of varying sizes.

A bar code scanner is typically used to decode the bar code printed on a product according to well known methods. The bar code scanner detects the optical reflection from the bar code for obtaining the widths of bars and spaces in the bar code and finding the corresponding characters. The bar code scanner also calculates a check character for the scanned bar code and ensures that the scanned check character corresponds to the calculated check character.

If all the characters including the check character are read without error, the scanner sends the decoded data to the POS terminal or self-checking terminal. However, if a portion of the bar code cannot be decoded, or if the calculation of the check character fails, the scanner transmits an error code to the POS terminal or self-checking terminal.

Scanning errors may occur for numerous reasons. For example a scanning error may occur if the bar code is too small, dirty, scratched, of poor quality, or of poor color. In this case, the user of the scanner must typically inspect the bar code on the product and manually enter the entire article number to the system. This method, however, if not only laborious for a store clerk who must quickly process each customer waiting in line, but also prone to errors from the clerk manually entering the bar code.

Accordingly, there is a need for a system and method for facilitating the recovery of bar code scanning errors. Such a system should allow the operator to efficiently determine the bar code characters that have not been successfully resolved. The system should also minimize the possibility for operator error that generally occurs in requesting the operator to manually enter the bar code data.

SUMMARY OF THE INVENTION

The present invention addresses and alleviates the above-mentioned deficiencies associated with the prior art. More particularly, the present invention is directed to an electronic shopping system that facilitates the recovery of bar code scanning errors that may occur due to irregularities in the bar code, such as the bar code size, contrast, dirt or scratches on the bar code, high radius bends, poor print quality, and the like. When a bar code scanning error occurs, the system displays the erroneously scanned bar code indicating the characters that could not be resolved successfully. The store clerk or operator enters the missing digits to confirm the scanned item without manually entering the entire code.

Alternatively, a search engine evaluates the portions of the bar code that have been successfully resolved and displays a text and/or graphics list of all products having the resolved portion of the bar code. The store clerk or operator then chooses the correct item from the screen list to confirm the scanned item.

In accordance with one embodiment of the invention, an electronic shopping system includes a network server with a memory that stores a plurality of merchandise item entries. Each entry is identified by a unique character code set with sequential code values uniquely identifying the merchandise (e.g. a bar code number). A terminal in the electronic shopping system communicates with the network server via a network signal bus. The terminal includes a character code set reader (e.g. a bar code scanner) that acquires a particular code set from an item of merchandise. The terminal also includes a processor with program instructions that allow the terminal to match the acquired code set to a corresponding code set in the memory, determine whether the acquired code set is a valid code set, and substitute a logical prompt in place of an invalid portion of the acquired code set. The terminal further includes a display for displaying the acquired code set with the substituted logical prompt.

In an additional aspect of the invention, the logical prompt prompts a user to complete the code set by entering a valid character code in the place of the logical prompt.

In yet another aspect of the invention, the display displays a plurality of products whose character code sets include character codes matching a valid portion of the acquired code set. The logical prompt then prompts a user to complete the code set by selecting one of the displayed products.

In a further aspect of the invention, a printer allows the completed character code set to be printed on a receipt paper. The user of the system may then use the printed bar code for items that continuously result in a bar code error.

The system may further keep a list of erroneously scanned bar codes. This allows manufacturers or retailers to improve their bar code quality by identifying those bar codes that consistently give a large number of errors due to a particular repetitive defect.

It should be appreciated, therefore, that the present system allows bar code errors to be resolved efficiently. Users of the system no longer need to engage in the process of manually entering the entire article number of an item that has been erroneously scanned. Instead, users need to only complete the invalid portions of the bar code, which is less laborious and prone to fewer errors from the user.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

In general terms, the present invention is directed to a particular system and method for identifying and recovering bar code scanning errors. When a bar code scanning error occurs, the system displays the erroneously scanned bar code indicating the characters that could not be resolved successfully. The store clerk or operator need only fill the missing digit to confirm the scanned item. In addition, a search engine can evaluate the portions of the bar code which have been successfully resolved and display a text and/or graphics list of all products having the resolved portion of the bar code. The store clerk or operator then need only choose the correct item from the screen list to confirm the sale.

Figure 3:
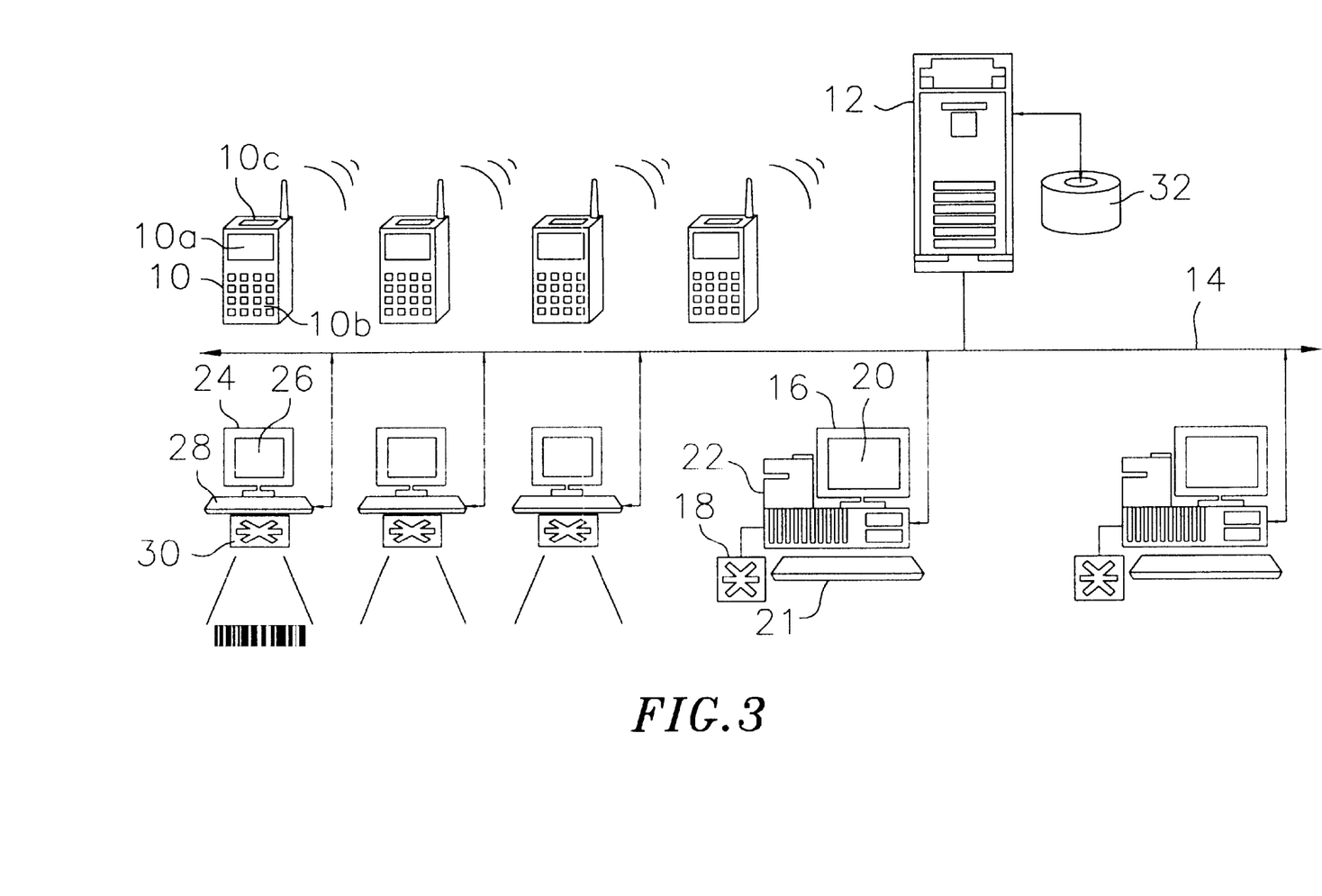
FIG. 3 is a simplified, semi-schematic illustration of an exemplary system configuration of an in-store network including self-scanning terminals and point-of-sale terminals.

Considering the above, FIG. 3 depicts a simplified, semi-schematic illustration of an exemplary system configuration of an in-store network including self-scanning terminals 10 and POS terminals 16. The system configuration of the illustrated embodiment is suitably employed in a retail store such as a supermarket, where items of merchandise are displayed on shelves for easy visibility and access by a customer.

The POS terminals 16 are normally operated by store personnel in a conventional fashion. POS terminals are typically computer-based, microprocessor operated sales terminals that sense, identify and register items being purchased by scanning an item's unique character code set, such as a bar code, with a bar code scanner 18. As each item is scanned, the item's bar code number, item description, and the item price are displayed on a display screen 20 for easy and convenient viewing and verification by the scanning clerk and the customer.

Each POS terminal 16 further includes a keyboard or keypad 21 to enable the scanning clerk to manually enter any portion of the bar code number of an item that is unable to have its bar code read. Pressure sensitive (touch screen) technology may also be incorporated into the display screen 20 for entering the bar code number by merely touching certain portions of the screen. The keyboard 21 alone or in combination with the touch screen is also used to select an icon of an erroneously scanned item in accordance with the invention as will be described further below.

Each POS terminal 16 also includes a printer 22 for printing customer receipts at the end of a transaction. The printer 22 further allows the scanning clerk to print a valid bar code of an item that is continuously being scanned erroneoulsy. The clerk may use the better quality bar code on the receipt instead of the bar code on the item itself.

As illustrated in FIG. 3, the POS terminals 16 are electronically connected to a network server or store platform computer system 12 via a network signal bus 14, configured to support and operate as a local area network. The particular configuration of the local area network is immaterial to operation of the system and method according to the invention, and might be any one of a number of conventional network configurations, whether serial or parallel, such as token-passing architectures, RS-485-type serial daisy-chains, serial arbitrated loops, and the like. Preferably, the network architecture is a serial, 10 Mbps/100 Mbps Ethernet architecture, such as 10/100 BASE-T LAN.

In contrast to the POS terminals 16 that are normally operated by store clerks, self-scanning terminals 10 are operated by the customers (shoppers). The self-scanning terminals are stand-alone hand held terminals that act as either price-check terminals for verifying the price of a particular item, or purchase transaction terminals for maintaining a running total of the customer's purchases.

Included in each self-scanning terminal 10 is a display 10a for displaying bar code data and other product-related information. The display 10a may constitute any unit capable of displaying information, but preferably includes a VGA or SVGA liquid-crystal-display (LCD) screen, or any other suitable display apparatus. Pressure sensitive (touch screen) technology may be incorporated into the display 10a so that a shopper may access the self-scanning terminal 10 by merely touching certain portions of the screen. Alternatively, a numeric or alpha-numeric button or keypad arrangement 10b is provided in combination with the display 10a to define an input device.

Each self-scanning terminal 10 is further configured with bar code scanning hardware 10c and software for allowing the customer to scan items for price verification or purchase transaction. As the customer scans each item, he or she may verify the item's bar code number displayed on the display 10a. If the self-scanning terminal 10 is unable to correctly scan the item's bar code, the customer uses the keypad arrangement 10b for recovering from the bar code scanning error as will be described further below.

The self-scanning terminals communicate wirelessly with the network server 12 via a wireless transceiver (not shown) preferably configured to transmit and receive RF signals between the terminal's control unit and a similar transceiver hosted by the server. It should be recognized by those having skill in the art, that a wireless transceiver need not be directly affixed to the network server 12. Rather, a plurality of RF transceivers may be located at periodic intervals throughout the retail facility and connected to the store server 12 through a local-area-network (LAN) array configuration, an arbitrated loop, or any other of a variety of conventional client-server topologies.

Alternatively, communication between the network server 12 and a distributed array of RF transceivers may be accomplished, for example, by time division multiple access (TDMA), frequency division multiple access (FDMA), or any other suitable method which avoids interference while communicating with multiple transceiver units. In any of the foregoing configurations, it will be evident to one having skill in the art that the self-scanning terminal 10 should be capable of communicating with the network server 12, regardless of the location of a shopper using the terminal and regardless of the size of the retail facility.

Provision is made in the exemplary system configuration of FIG. 3, for coupling additional terminal types to the network signal bus 14 such that they might interface with the store network server 12. These additional terminal types, identified at 24, may include store PC-based work stations, self-scanning and self-checkout kiosk terminals, and the like. These additional terminals 24 are all configured to include at least a display screen 26, some form of I/O device 28, such as a keyboard, keypad, and the like, and a bar code scanner 30 for scanning a merchandise item's bar code number and affecting purchase transactions.

In accordance with the exemplary system configuration of FIG. 3, the network server 12 includes a mass storage device 32, such as a hard disk drive, or drive array, which hosts a number of purpose-built databases and files useful for implementation of the system of the present invention. Particular such databases and files include a Price Look-up File (PLU), a transaction log file, and optionally a customer database which includes demographic, personal preference, personal profile and other information specific to each customer. In the case where the mass storage device 32 is configured to include a customer database, it should be noted that each particular customer's data record is identified by and associated with a unique customer identification number, termed a customer ID. Each customer's ID number is hosted on a customer ID card which, when presented, identifies that customer and enables either a clerk-operated POS terminal or a customer operated self-scanning terminal to access that customer's data record from the network server's mass storage device 32.

Figure 4:
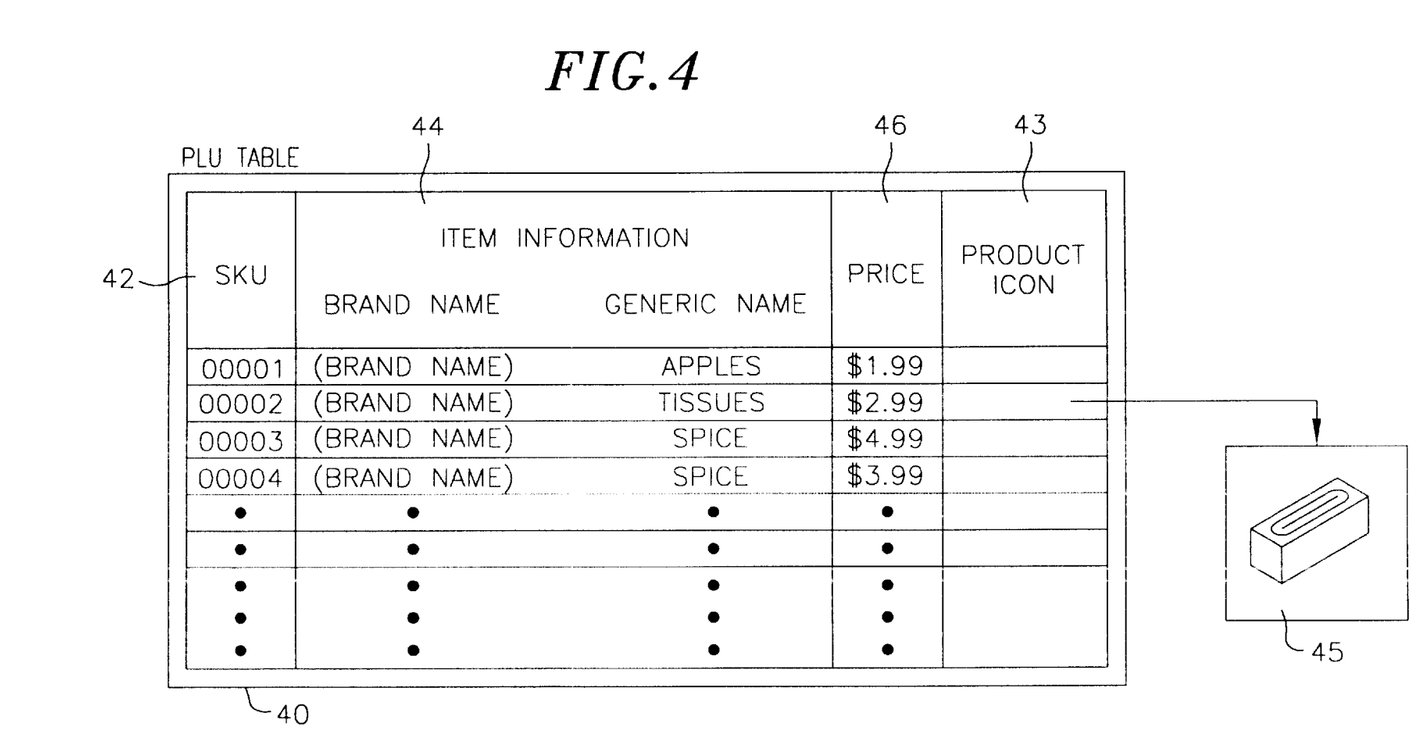
FIG. 4 is a schematic layout diagram of an exemplary price-lookup table.

FIG. 4 is a schematic layout diagram of an exemplary PLU table 40 stored in the network server's mass storage device 32. Alternatively, the PLU table 40 is stored the memory of each POS terminal 16. The PLU table 40 includes a set of merchandise specific information which may be arranged in a variety of ways, but is most advantageously configured as sequential entries, with each entry specific to a particular merchandise item. A particular merchandise entry preferably includes a store's item identifier, such as a Stock Keeping Unit (SKU) number 42, which is identified to a particular product's UPC, EAN, or JAN by a suitable conversion routine. A particular merchandise entry further includes an item information field 44, typically implemented as a text string that gives the brand or trade name of the product and includes a generic description of the product as well as an identifying weights and measures metric, i.e., KLEENEX® Tissues, 500 pcs.

In addition to the SKU number 42 and item information field 44, each merchandise item entry further includes a price field 46 which may be further subdivided into an item price portion which contains the item price, i.e., $1.99, and a price comparison portion which contains an item's price-per-unit, i.e., 2.0¢ per piece.

Each merchandise item entry also includes a product icon field 43 storing a pointer or an index to the product's image file 45 stored in an image database of the network server's mass storage device 32. The image file preferably contains graphics data of the product identified in the item information field 44.

Figure 5:
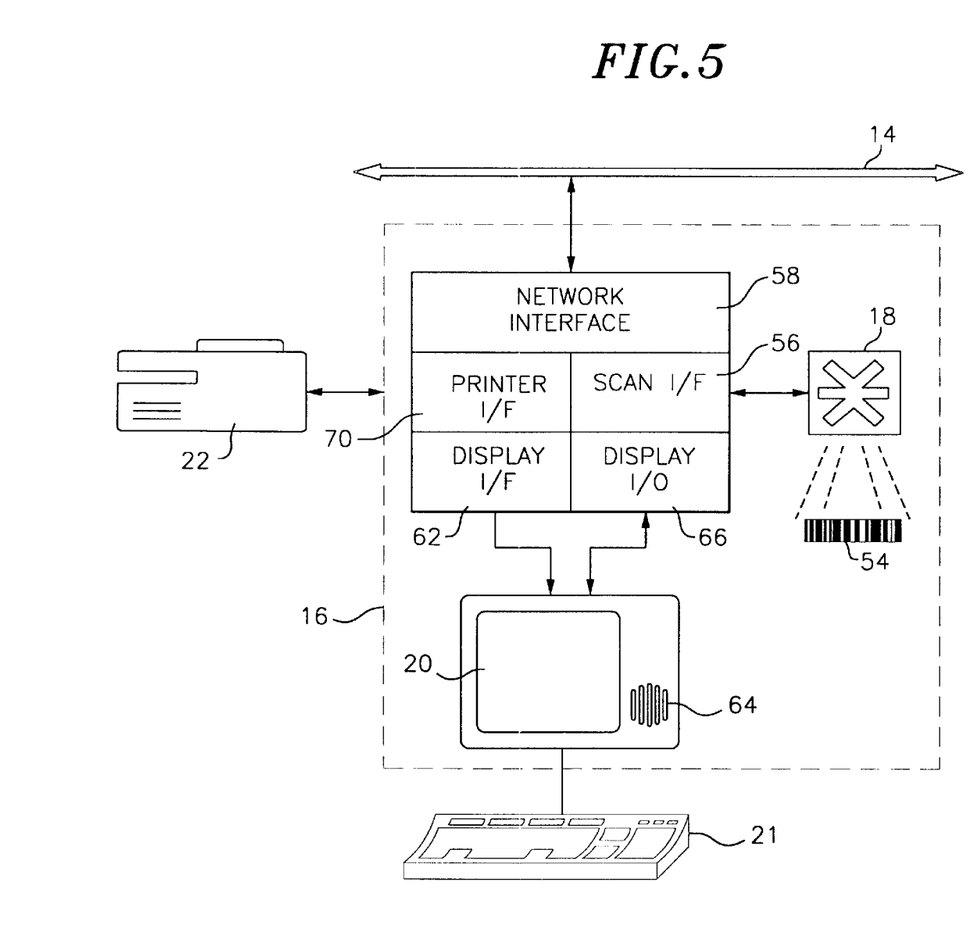
FIG. 5 is a schematic block diagram of the hardware configuration of a point-of-sale terminal of FIG. 1.

FIG. 5 is a schematic block diagram of the hardware configuration of a POS terminal 16 for facilitating recovery of bar code scanning errors. A person skilled in the art should recognize, however, that this hardware configuration may be extended to self-scanning terminals 10 without departing from the scope and spirit of the present invention.

Upon scanning of an item's bar code, the terminal's bar code scanner 18 transmits the item's UPC, EAN, or JAN code in a data stream to the scanner interface circuitry 56 which may then extract the particular item's SKU code from the data stream. The scanner interface circuitry 56 forwards the item's SKU code number to the network server 12 over a network interface circuitry 58 configured to couple the POS terminal 16 to the network signal bus 14. Alternatively, rather than extracting an SKU code from the data stream, the scanner interface circuitry 56 may be configured to directly forward all of the information comprising the UPC, EAN, or JAN bar code to the network server 12 through the network interface 58 and network signal bus 14. In yet another embodiment where the PLU table 40 is stored in the POS terminal itself, neither the scanned bar code not SKU number are forwarded to the network server. Instead, all processing of the bar code is done by the POS terminal.

Following transmission of the product bar code information, the store's network server 12 invokes a search and retrieval subroutine that searches the PLU table 40 for the scanned item's SKU code. Once a match is made between a scanned item's SKU code and an SKU field of a particular merchandise item entry, the network server transmits the information contained therein to the POS terminal 16 over the network signal bus 14. The POS terminal 16 receives the transmitted information through its network interface circuitry 58 and displays the information on the display screen 20 through a display interface circuitry 62.

In order to indicate that an item has been correctly scanned by the barcode reader 18, the POS terminal 16 also includes a speaker 64 or some other audio generating device that is controlled either by the display panel I/O circuitry 66 or some other piece of miscellaneous I/O interface circuitry. The speaker 64 emits an audible "beep" to indicate that an item's bar code has been successfully scanned in.

Alternatively, the speaker 64 emits a different audio signal in the event that an item's bar code is unable to be scanned correctly. In this scenario, the bar code scanner 18 creates a data stream by decoding the characters which are able to be read successfully inserting a user-defined error character in all the places where a bar code character cannot be resolved. The bar code scanner 18 then inserts an error code into the data stream and transmits the data stream with the error code and the incomplete bar code to the scanner interface 56. If, however, too many characters of the bar code cannot be resolved, the bar code scanner simply transmits the error code without the data stream. In this latter scenario, the store clerk resorts to manual inspection and data entry as is currently done in the prior art.

Figure 6:
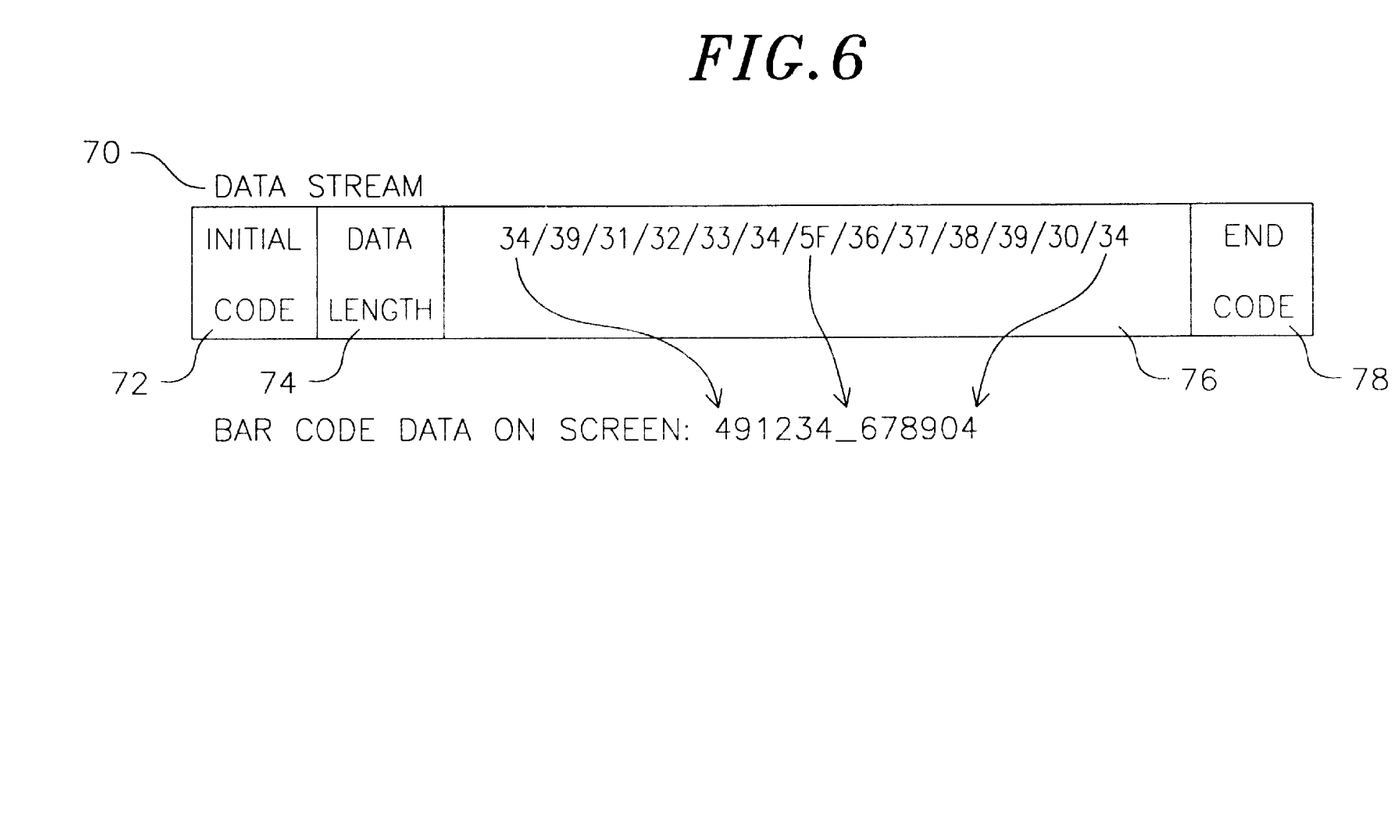
FIG. 6 is a schematic layout diagram of an exemplary bar code data stream.

FIG. 6 is a schematic layout diagram of an exemplary bar code data stream 70. Each data stream is headed by an initial code 72 indicating either the start of a correctly decoded bar code or an incorrect decoding. Following the initial code 72 is the length 74 of the bar code data which differs based on whether the UPC, JAN, or EAN codes are used, and their particular versions. For example, the UPC code consists of a 12 digit number. The standard version of the JAN and EAN codes, on the other hand, includes 13 digits, and the short version includes 8 digits.

The data portion 76 of the data stream 70 includes the actual bar code characters. Preferably, each character is represented by an ASCII hex code. If a character cannot be resolved, an error code is substituted into the data stream in place of the ASCII character. According to one embodiment of the invention, the error code is an underscore character (hex code 5F). A person skilled in the art should recognize, however, that any other user defined error codes may be utilized, such as an asterisk, instead of the underscore character.

An end code 78 is used to mark the end of the data portion 76 of the data stream 70.

Upon receipt of a data stream 70 including an error code as the initial code 72, the POS terminal 16 proceeds to display the incomplete bar code in the data portion 76 of the data stream with each missing digit indicated by, for example, the underscore character. Preferably, a blinking cursor is placed on the first of such error characters. The store clerk then checks the bar code on the erroneously scanned item and obtains the missing digits. The store clerk enters these missing digits using the keyboard 21 to confirm the scanned item.

In an alternative embodiment, the bar code scanner 18 attempts to make an educated guess of the missing characters in the data stream. For example, in the case of either an EAN or JAN code where the first two characters indicate a country of manufacture, the bar code scanner may make certain assumptions about such erroneously scanned characters based on information of what is sold in the retail store. If the store does not sell any overseas products, the retailer's country code may be inserted in the place of the initial two characters of the bar code that could not be successfully resolved. The store clerk is then be prompted to verify that the inserted codes are in fact correct.

In other situations, however, the bar code scanner 18 may insert an error character for a character that can be resolved successfully. For example, the scanner 18 may be able to decode the check character successfully, but may insert an error character instead if the calculation of the check character differs from the scanned check character due to other errors in the bar code. In this scenario, the blinking cursor is placed at the beginning of the bar code prompting the store clerk to verify the entire code for any errors.

Figure 7:
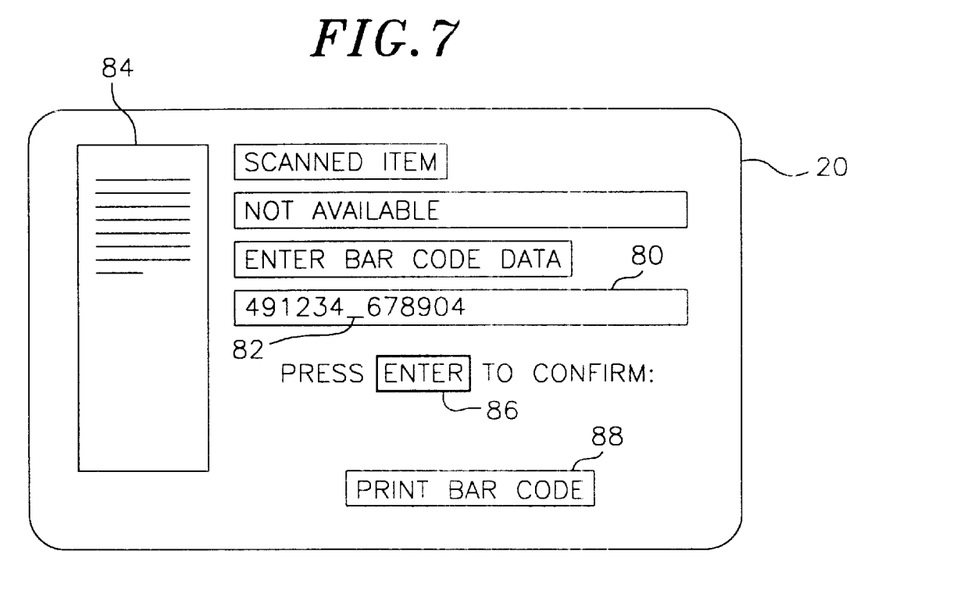
FIG. 7 is a schematic layout diagram of a screen indicating that an item has been erroneously scanned.

FIG. 7 is a schematic layout diagram of a screen indicating that an item has been erroneously scanned. The screen includes an area 80 for displaying the incomplete bar code including an error character 82. The screen further includes a transaction log area 84 listing the items that have been scanned so far. The store clerk then enters the missing bar code character in the place of the error character and actuates an enter button 86 to submit the corrected bar code data to the network server 12 via the network interface 58.

Figure 8:
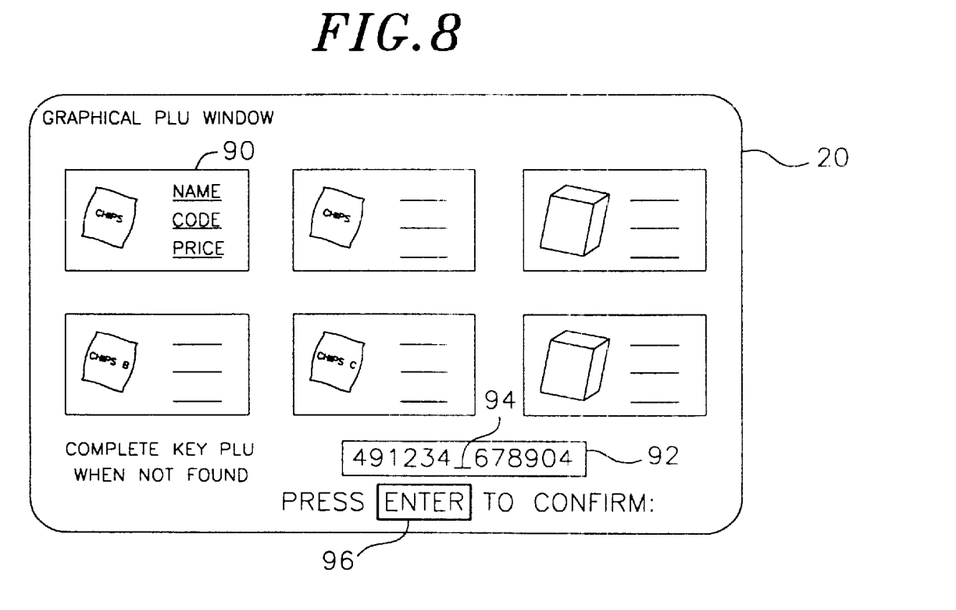
FIG. 8 is a schematic layout diagram of a screen depicting a graphical list of potential items that correspond to an erroneously scanned bar code.

In an alternative embodiment, the store clerk is presented with a text and/or graphical list of potential items that match the portion of the bar code data that was able of being resolved successfully. FIG. 8 is a schematic layout diagram of such a screen. In the illustration of FIG. 8, the graphical images for the potential items are displayed in separate windows 90 along with the item name, item bar code number, price, and the like. In this regard, the erroneous scan of a particular item causes the scan interface 56 to transmit a data stream including the error code and incomplete bar code to the network server 12. Upon receipt of the incomplete bar code, the network server 12 invokes a search and retrieval subroutine that searches the PLU table 40 for potential items whose bar codes match the portion of the bar code data that was able to be resolved successfully. Once these items have been identified, the network server converts their SKU number to a bar code number and obtains their item information, price, and/or graphical image for transmitting such information to the POS terminal 16 over the network signal bus 14.

The POS terminal 16 receives the transmitted information through its network interface circuitry 58 and displays the information along with the scanned bar code number on the display screen 20. The screen also displays the incomplete bar code data 92 prompting the store clerk to enter the missing bar code character. In doing so, the store clerk may highlight one of the product windows 90 corresponding to the matching product for automatically replacing the incomplete bar code with the bar code of the highlighted product. Alternatively, the user manually replaces the missing character 94 with the corresponding character of the matching product using the keyboard 21. The store clerk then actuates an enter button 96 to submit the corrected bar code data to the network server 12.

In addition to the above, the network server 12 stores an error log in the mass storage device 32 with a list of erroneously scanned bar codes. Bar code error data logging allows a store to analyze the various error codes and identify continuously repetitive bar code errors. This allows particular manufacturers or retailers to improve their bar code quality by identifying those bar codes which consistently give a large number of errors due to a particular repetitive defect such as the bar code's size, color, position, direction, and the like.

Figure 9:
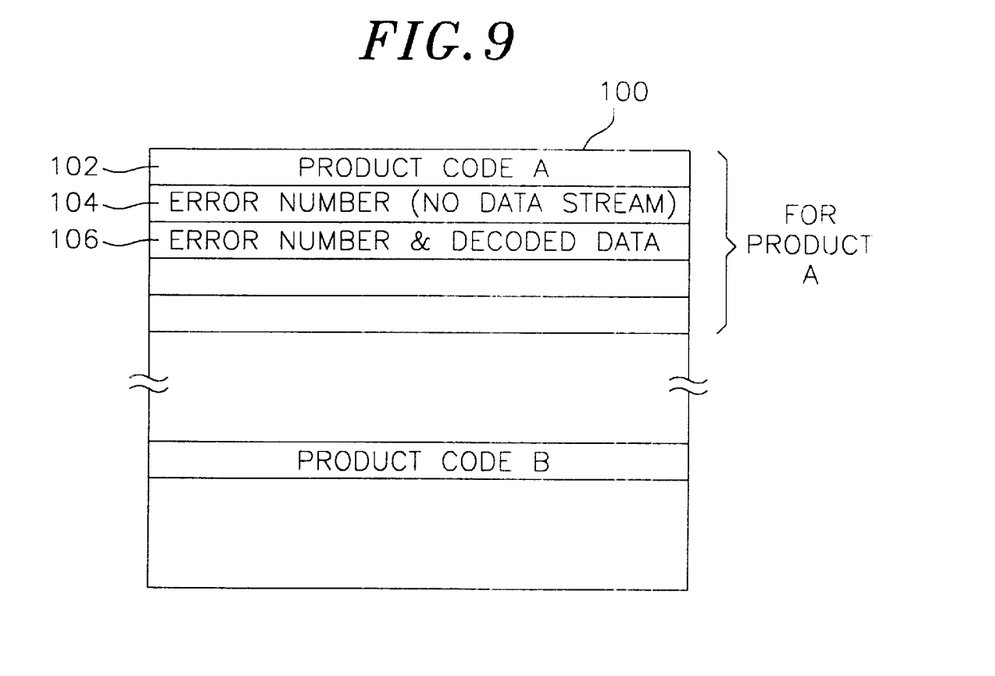
FIG. 9 is a schematic layout diagram of an exemplary error log.

FIG. 9 is a schematic layout diagram of an exemplary error log 100. The error log includes a set of merchandise specific information which may be arranged in a variety of ways, but is most advantageously configured as sequential entries, with each entry specific to a particular merchandise item. A particular error entry preferably begins with the item's correct bar code 102. Each error entry further includes a list of errors received for the item. Such errors may include simply an error number without a data stream 104, or an error number along with a data stream including an incomplete bar code and one or more error characters.

Figure 10:
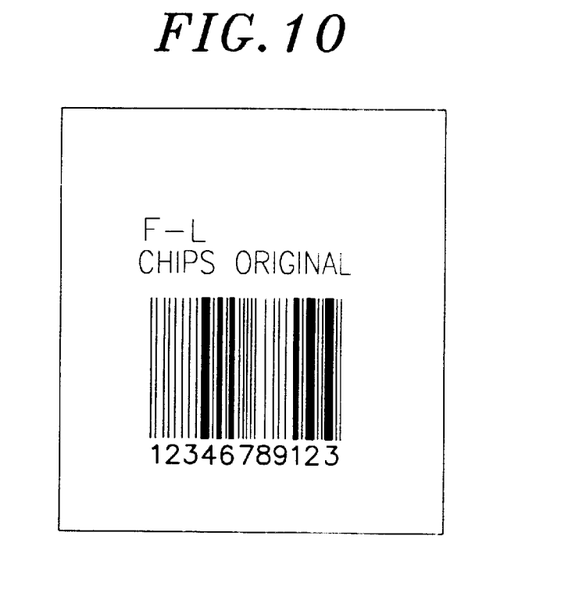
FIG. 10 is an exemplary printout of a bar code on a receipt paper.

Referring back to FIG. 5, the POS terminal further includes a printer 22 for allowing a store clerk to print a receipt paper for a customer or a better quality bar code data if a particular bar code is continuously misread. In regards to the latter use of the printer 22, the store clerk, after entering the missing bar code character in area 80 (FIG. 7), actuates a print bar code button 88. The printer interface 70 invokes the printer to print the bar code on the receipt paper along with the name of the product as illustrated in FIG. 10. The store clerk may then scan the printed bar code instead of the bar code on the actual item for future scans of the item.

While the invention has been described with respect to particular illustrated embodiment, those skilled in the art and technology to which the invention pertains will have no difficulty devising variations which in no way depart from the invention. For example, while the illustrated embodiments have been described in connection with a store server system coupled to a local network, it will be appreciated that a distributed set of network servers could be employed to like effect and utility without departing from the present invention. In addition, the wireless communication between the self-scanning system 10 and the network server 12 may be infrared as well as RF. Accordingly, the present invention is not limited to the specific embodiments described above, but rather as defined by the scope of the appended claims and their equivalents.

What is claimed is:

1. In an electronic shopping system including a network server having a memory storing a plurality of merchandise item entries, each entry identified by a unique bar code set, the set including sequential code values uniquely identifying the merchandise, a terminal in communication with the network server including:

means for communicating with the network server;

a bar code set reader acquiring a particular bar code set from an item of merchandise;

a processor coupled to the memory and the bar code set reader, the processor being operable to execute program instructions including:

matching the acquired code set to a corresponding code set in the memory;

determining whether the acquired code set is a valid code set; and         substituting a logical prompt in place of an invalid portion of the acquired code set; and     a display for displaying the acquired code set with the substituted logical prompt.

2. The system of claim 1, wherein the bar code set is a bar code number.

3. The system of claim 1, wherein the logical prompt is a pre-determined error character.

4. The system of claim 1, wherein the logical prompt prompts a user to complete the code set by entering a valid character code in the place of the logical prompt.

5. The system of claim 1, wherein the display further displays a plurality of products whose bar code sets include character codes matching a valid portion of the acquired code set.

6. The system of claim 5, wherein the logical prompt prompts a user to complete the code set by selecting one of the displayed products.

7. The system of claim 5, wherein the display includes images of the products.

8. An electronic shopping system for performing merchandise purchase transactions, the system comprising:

a memory storing a plurality of merchandise item entries, each entry identified by a unique bar code set, the set including sequential code values uniquely identifying the merchandise;

a bar code set reader acquiring a particular code set from an item of merchandise;

means for matching the acquired code set to a corresponding code set in the memory;

means for determining whether the acquired code set is a valid code set;

means for substituting a logical prompt in place of an invalid portion of the acquired code set; and     a display for displaying the acquired code set with the substituted logical prompt.

9. The system of claim 8, wherein the bar code set is a bar code number.

10. The system of claim 8, wherein the logical prompt is a pre-determined error character.

11. The system of claim 8 further comprising means for completing the acquired code set with valid character codes.

12. The system of claim 11, wherein the means for completing includes means for entering a valid character code in the place of the logical prompt.

13. The system of claim 11, wherein the display further displays a plurality of products whose bar code sets include character codes matching a valid portion of the acquired code set.

14. The system of claim 13, wherein the means for completing includes means for selecting one of the displayed products.

15. The system of claim 13, wherein the display includes images of the products.

16. The system of claim 11 further including a printer for printing the completed code 17.

17. The system of claim 8 further including means for maintaining a list of erroneously scanned bar codes.

18. In an electronic shopping system, a terminal comprising:

a bar code set reader acquiring a bar code set from an item of merchandise and transmitting the acquired bar code set in a data stream, the bar code set reader inserting one or more substitution characters into an invalid portion of the data stream upon detection of a read error;

a display for displaying valid and invalid portions of the data stream, the invalid portion including the substitution characters, wherein a user is prompted to replace the substitution characters with one or more valid character codes for completing the data stream.

19. The terminal of claim 18, wherein the bar code set is a bar code number.

20. The system of claim 18, wherein the substitution character is a pre-determined error character.

21. The system of claim 18, wherein the display further displays a plurality of products whose bar code sets include character codes matching the valid portion of the data stream.

22. The system of claim 21, wherein the user selects one of the displayed products for completing the data stream.

23. The system of claim 21, wherein the display includes images of the products.

24. In an electronic shopping system including a network server having a memory storing a plurality of merchandise item entries, each entry identified by a unique bar code set, the set including sequential code values uniquely identifying the merchandise, a method for performing merchandise purchase transactions including:

acquiring a particular bar code set from an item of merchandise;

matching the acquired code set to a corresponding code set in the memory;

determining whether the acquired code set is a valid code set; and     substituting a logical prompt in place of an invalid portion of the acquired code set, and displaying the acquired code set with the substituted logical prompt.

25. The method of claim 24, wherein the bar code set is a bar code number.

26. The method of claim 24, wherein the logical prompt is a pre-determined error character.

27. The method of claim 24, wherein the logical prompt prompts a user to complete the code set by entering a valid character code in the place of the logical prompt.

28. The method of claim 24 further comprising displaying a plurality of products whose bar code sets include character codes matching a valid portion of the acquired code set.

29. The method of claim 28, wherein the logical prompt prompts a user to complete the code set by selecting one of the displayed products.

30. The method of claim 28, wherein the displaying includes displaying images of the products.

\* \* \* \* \*

UNITED STATES PATENT AND TRADEMARK OFFICE
CERTIFICATE OF CORRECTION

PATENT NO. : 6,540,143 B1
DATED : April 1, 2003
INVENTOR(S) : Kunihiko Matsumori It is certified that error appears in the above-identified patent and that said Letters Patent is hereby corrected as shown below:

Column 10,
Line 4, delete "17"
Line 45, at "displaying," start a new paragraph
Line 45, change comma before "and" to a semi-colon Signed and Sealed this Nineteenth Day of October, 2004

JON W. DUDAS
*Director of the United States Patent and Trademark Office*